(12) United States Patent
Yoshizumi et al.

(10) Patent No.: US 8,927,067 B2
(45) Date of Patent: Jan. 6, 2015

(54) INFRARED RAY CUT-OFF MATERIAL, DISPERSION OF INFRARED RAY CUT-OFF MATERIAL, INFRARED RAY CUT-OFF FILM-FORMING COMPOSITION, AND INFRARED RAY CUT-OFF FILM

(71) Applicants: Mitsubishi Materials Corporation, Tokyo (JP); Mitsubishi Materials Electronic Chemicals Co., Ltd., Akita-shi (JP)

(72) Inventors: Motohiko Yoshizumi, Akita (JP); Akira Nakabayashi, Sunto-gun (JP)

(73) Assignees: Mitsubishi Materials Corporation, Tokyo (JP); Mitsubishi Materials Electronic Chemicals Co., Ltd., Akita-shi (JP)

( * ) Notice: Subject to any disclaimer, the term of this patent is extended or adjusted under 35 U.S.C. 154(b) by 0 days.

(21) Appl. No.: 13/978,982

(22) PCT Filed: Jan. 11, 2013

(86) PCT No.: PCT/JP2013/050427
§ 371 (c)(1),
(2) Date: Jul. 10, 2013

(87) PCT Pub. No.: WO2013/105646
PCT Pub. Date: Jul. 18, 2013

(65) Prior Publication Data
US 2014/0320954 A1    Oct. 30, 2014

(30) Foreign Application Priority Data

Jan. 11, 2012  (JP) ................. 2012-002946

(51) Int. Cl.
| | | |
|---|---|---|
| *C01G 30/00* | (2006.01) | |
| *C09D 5/32* | (2006.01) | |
| *C09D 201/00* | (2006.01) | |
| *C09D 7/12* | (2006.01) | |
| *G02B 5/20* | (2006.01) | |
| *C03C 4/08* | (2006.01) | |
| *C03C 3/16* | (2006.01) | |

(52) U.S. Cl.
CPC ............... *G02B 5/208* (2013.01); *C03C 4/082* (2013.01); *C03C 3/16* (2013.01)

USPC ........... 427/453; 427/542; 427/557; 427/576; 524/430

(58) Field of Classification Search
CPC .......... G02B 5/208; C03C 4/082; C03C 3/16
USPC ................... 427/453, 542, 557, 576; 524/430
See application file for complete search history.

(56) References Cited

U.S. PATENT DOCUMENTS

| 6,218,018 B1 * | 4/2001 | McKown et al. ............. 428/432 |
| 7,622,186 B2 * | 11/2009 | Terneu et al. ................. 428/336 |
| 2010/0025638 A1 | 2/2010 | Murota et al. |

FOREIGN PATENT DOCUMENTS

| CN | 1263874 A | 8/2000 |
|---|---|---|
| EP | 1201616 A2 | 5/2002 |
| EP | 1676890 A1 | 7/2006 |
| JP | 06-183733 A | 7/1994 |
| JP | 07-069632 A | 3/1995 |
| JP | 10-255548 A | 9/1998 |
| JP | 2004-149329 A | 5/2004 |
| JP | 2007-154152 A | 6/2007 |
| JP | 2011-093754 A | 5/2011 |
| WO | WO-2010/143645 A1 | 12/2010 |

OTHER PUBLICATIONS

Supplementary European Search Report dated Apr. 28, 2014, issued for the European patent application No. 13733219.3.
International Search Report dated Apr. 2, 2013, issued for PCT/JP2013/050427 and English translation thereof.
Office Action dated Jan. 28, 2014, issued for the Chinese patent application No. 201380000473.5 and English translation thereof.

* cited by examiner

*Primary Examiner* — Michael M Bernshteyn
(74) *Attorney, Agent, or Firm* — Edwards Wildman Palmer LLP

(57) ABSTRACT

An infrared ray cut-off material is formed of phosphorus-doped antimony tin oxide powder, in which a content of antimony in terms of $SbO_2$ is not less than 14 parts by mass and not more than 30 parts by mass with respect to 100 parts by mass of the infrared ray cut-off material, a content of phosphorus in terms of $PO_{2.5}$ is not less than 1 part by mass and not more than 25 parts by mass with respect to 100 parts by mass of the infrared ray cut-off material, and a balance other than antinomy oxide and phosphorus oxide is tin oxide.

6 Claims, 1 Drawing Sheet

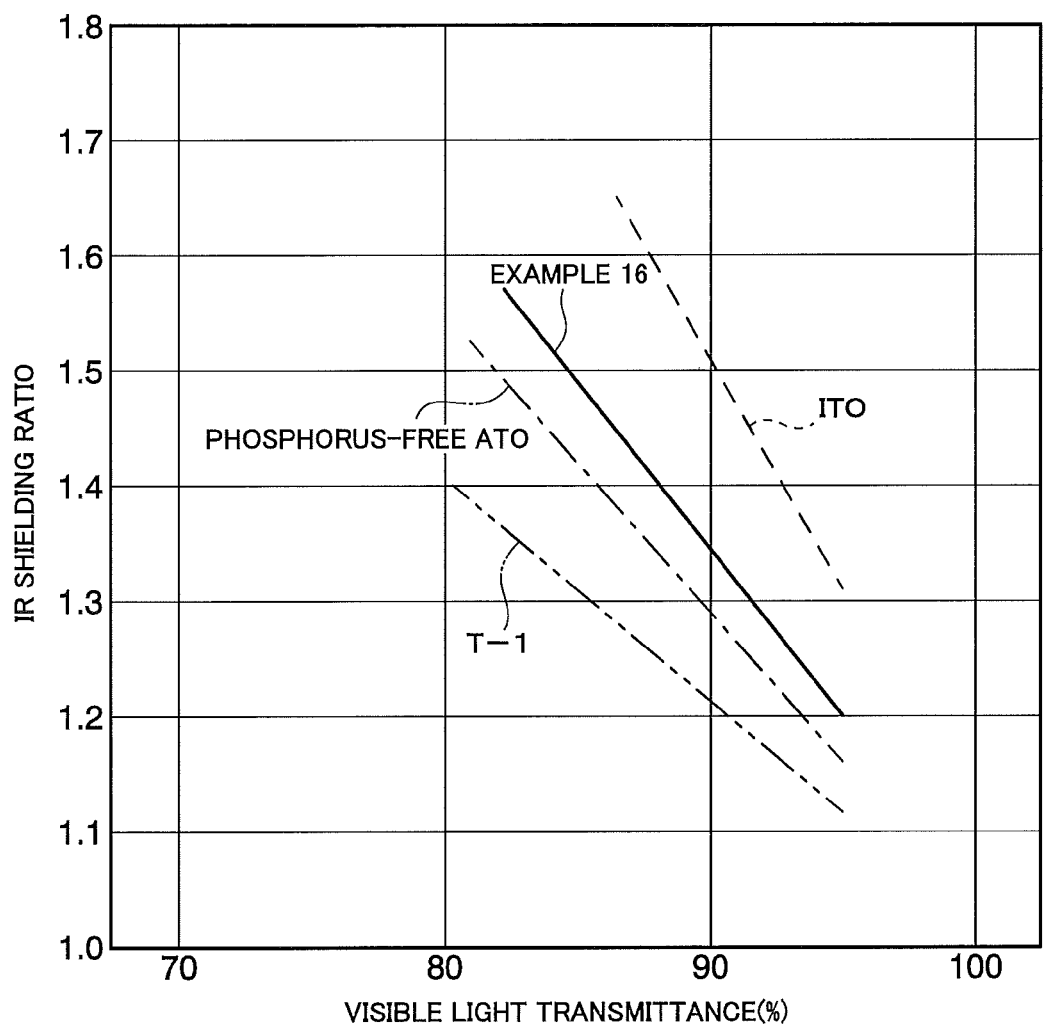

US 8,927,067 B2

INFRARED RAY CUT-OFF MATERIAL, DISPERSION OF INFRARED RAY CUT-OFF MATERIAL, INFRARED RAY CUT-OFF FILM-FORMING COMPOSITION, AND INFRARED RAY CUT-OFF FILM

TECHNICAL FIELD

The present invention relates to an infrared ray cut-off material that is used for forming an infrared ray cut-off film having high transmittance to visible lights and relatively low transmittance to light rays with a wavelength longer than or equal to that of near infrared rays; a dispersion of an infrared ray cut-off material; an infrared ray cut-off film-forming composition, and an infrared ray cut-off film.

Priority is claimed on Japanese Patent Application No. 2012-002946, filed Jan. 11, 2012, the content of which is incorporated herein by reference.

BACKGROUND ART

In the related art, as such an infrared ray cut-off material, indium tin oxide powder (hereinafter, referred to as "ITO powder") and antimony tin oxide powder (hereinafter, referred to as "ATO powder") are known. ITO powder has high transparency to visible lights and high infrared ray cutting performance, but is expensive. Therefore, there are problems in that the cost is high and rare metal is used. On the other hand, ATO powder is cheaper than ITO powder. However, ATO powder has low transmittance of visible lights, does not satisfy the requirement for high transparency, and has lower performance of cutting near infrared rays than that of ITO powder (Patent Document 1). For example, in the case of ATO powder (trade name: T-1; manufactured by Mitsubishi Materials Electronic Chemicals Co., Ltd.), which is a well-known ATO powder, when the transmittance of visible lights is set to 90%, an IR shielding ratio (Visible Light Transmittance (% Tv)/Solar Transmittance(% Ts)) is approximately 1.2. Fluorine-doped tin oxide powder (FTO powder) also absorbs near infrared rays, but has a low IR shielding ratio of approximately 1.2. In addition, infrared ray cut-off materials such as lanthanum boride and tungsten-based compounds have problems of absorbing visible lights and having low absorption capacity of near infrared rays. Wavelengths of respective light rays described in this specification are defined as follows: visible lights (380 nm to 780 nm); near infrared rays (780 nm to 2.5 μm); and infrared rays (780 nm to 1000 μm).

PRIOR ART DOCUMENTS

Patent Documents

[Patent Document 1] Japanese Unexamined Patent Application, First Publication No. H7-69632

SUMMARY OF INVENTION

Technical Problem

An object of the present invention is to provide, for example, an infrared ray cut-off material capable of forming an infrared ray cut-off film that is inexpensive; has high transparency to visible lights; has the same cutting performance to, in particular, infrared rays having a wavelength of 2000 nm or longer as that of a film formed of ITO powder; and has a higher IR shielding ratio than that of ATO powder in the prior art.

Solution to Problem

In order to solve the above-described problems, respective aspects of the present invention have the following configurations.

[1] An infrared ray cut-off material that is formed of phosphorus-doped antimony tin oxide powder, wherein a content of antimony in terms of $SbO_2$ is not less than 14 parts by mass and not more than 30 parts by mass with respect to 100 parts by mass of the infrared ray cut-off material, a content of phosphorus in terms of $PO_{25}$ is not less than 1 part by mass and not more than 25 parts by mass with respect to 100 parts by mass of the infrared ray cut-off material, and a balance other than antinomy oxide and phosphorus oxide is tin oxide.

According to this aspect, an infrared ray cut-off film that has high transmittance to visible lights and high infrared ray cutting performance can be formed at a low manufacturing cost.

[2] The infrared ray cut-off material according to [1], wherein a BET diameter of the infrared ray cut-off material, calculated from a specific surface area thereof, is not less than 0.005 μm and not more than 0.03 μm.

In this case, the dispersibility of the infrared ray cut-off material in a solvent or a film is high; and a high visible light transmittance and an infrared ray cutting effect can be stably obtained.

[3] A dispersion of an infrared ray cut-off material obtained by dispersing the infrared ray cut-off material according to [1] in a solvent.

[4] An infrared ray cut-off film-forming composition obtained by dispersing the infrared ray cut-off material according to [1] and a resin in a solvent.

According to the dispersion of [3] and the composition of [4], a film containing the infrared ray cut-off material can be easily formed.

[5] An infrared ray cut-off film containing the infrared ray cut-off material according to [1] in a film formed of a resin.

This infrared ray cut-off film has high transmittance to visible lights, high infrared ray cutting performance, and a low manufacturing cost.

[6] The infrared ray cut-off film according to [5], wherein when a visible light transmittance (% Tv) of the infrared ray cut-off film is set to 90%, an IR shielding ratio [(% Tv)/(% Ts)], which is the ratio of the visible light transmittance (% Tv) to a solar transmittance (% Ts), is higher than or equal to 1.30.

In this case, the transmittance to visible lights is higher; and higher infrared ray cutting performance can be obtained.

Effects of Invention

As described above, according to the present invention, an infrared ray cut-off film that has high transmittance to visible lights and high infrared ray cutting performance can be formed at a low manufacturing cost.

BRIEF DESCRIPTION OF DRAWINGS

FIG. 1 is a graph illustrating a relationship between an IR shielding ratio and a visible light transmittance regarding an infrared ray cut-off material according to an example of the present invention, ITO powder, phosphorus-free ATO powder, and commercially available ATO powder.

BEST MODE FOR CARRYING OUT THE INVENTION

Hereinbelow, embodiments of the present invention will be described in detail.
(Infrared Ray Cut-Off Material)

An infrared ray cut-off material according to an embodiment of the present invention is formed of phosphorus-doped antimony tin oxide powder, in which a content of antimony in terms of $SbO_2$ is not less than 14 parts by mass and not more than 30 parts by mass with respect to 100 parts by mass of the infrared ray cut-off material; a content of phosphorus in terms of $PO_{2.5}$ is not less than 1 part by mass and not more than 25 parts by mass with respect to 100 parts by mass of the infrared ray cut-off material; and a balance other than antinomy oxide and phosphorus oxide is tin oxide. This infrared ray cut-off material has high transmittance to visible lights and relatively low transmittance to, in particular, infrared rays having a wavelength of 2000 nm or longer.

When the contents of antimony and phosphorus are out of the above-described ranges, in a case where a visible light transmittance (% Tv) of an infrared ray cut-off film formed of the infrared ray cut-off material is set to 90%, it is difficult to control an IR shielding ratio to be higher than 1.30. The IR shielding ratio is the ratio [(% Tv)/(% Ts)] of the visible light transmittance (% Tv) to a solar transmittance (% Ts). As illustrated below in FIG. 1, when the visible light transmittance (% Tv) varies, the IR shielding ratio has different values correspondingly. Therefore, a normalized value of visible light transmittance (% Tv) of 90% is used for comparison.

The visible light transmittance (% Tv) is the index indicating transmittance properties of only visible lights (380 nm to 780 nm); and is the value obtained based on JIS R 3106 (1998) "Testing Method on Transmittance, Reflectance and Emittance of Flat Glasses and Evaluation of Solar Heat Gain Coefficient".

The solar transmittance (% Ts) is the index indicating transmittance properties of solar rays in the visible light range to the near infrared range (380 nm to 2500 nm); and is the value obtained based on JIS R 3106 (1998). In addition, the transmittance at 2000 nm is the value at a wavelength of 2000 nm based on this measurement method.

In order to measure the IR shielding ratio at a visible light transmittance of 90%, plural infrared ray cut-off films having different thicknesses are formed of the same infrared ray cut-off material, respective measured values are connected to obtain a straight line as illustrated in FIG. 1, and an IR shielding ratio at a point of visible light transmittance of 90% is obtained from the straight line. Technically, a resin constituting the infrared ray cut-off films also affects the respective measured values of transmittance, but the effect thereof is smaller than that of the infrared ray cut-off material and thus is negligible. In addition, as a method of easily measuring the IR shielding ratio at a visible light transmittance of 90%, a method may be used in which IR shielding ratios of both the infrared ray cut-off film and a laminated film of the same two infrared ray cut-off materials are measured; the respective measured values are connected to obtain a straight line as illustrated in FIG. 1; and an IR shielding ratio at a point of visible light transmittance of 90% is obtained from the straight line. In this case, there is an effect of light reflection at an interface between the two films, but the effect is negligible at a visible light transmittance of 90%.

The infrared ray cut-off material is normally white or bluish white powder. A particle size of the powder is not particularly limited, but is preferably not less than 0.005 μm and not more than 0.03 μm and is more preferably 0.01 μm to 0.02 μm from the viewpoints of visible light transmittance, solar transmittance, and dispersibility during coating. It is preferable that the particle size of the infrared ray cut-off material be as uniform as possible. The particle size indicates the BET diameter calculated from a specific surface area of the infrared ray cut-off material as follows.

BET Diameter(μm)=6/(True Density(g/cm$^3$)×BET Value(m$^2$/g))

Specifically, $N_2$ gas may be introduced into the infrared ray cut-off material in a cell (77° K) so as to come into contact with each other and be balanced; and the amount of adsorption gas at this time may be measured to obtain a BET value with a BET method (refer to p. 22, APPIE Standard "SAP 05-98-1998", Nov. 27, 1998, The Association of Powder Process Industry and Engineering, Japan).

The particle shape of the infrared ray cut-off material is not particularly limited but may be spherical, elliptical, flat, polyhedral, indefinite, or the like. In addition, particles may be non-porous or porous. In the visible light range, it is preferable that transparency be high. To that end, it is preferable that the haze of a film be low, it is more preferable that the particle shape be spherical or cubic, and it is more preferable that the particles be non-porous.

The infrared ray cut-off material according to the embodiment can be manufactured by coprecipitating respective hydroxides of phosphorus, antimony, and tin from an aqueous solution containing phosphorus, antimony, and tin; and baking the coprecipitated hydroxides.

Examples of a method of coprecipitating hydroxides of phosphorus, antimony, and tin from the aqueous solution containing phosphorus, antimony, and tin, include the following methods:

(1) a method of adding dropwise a mixed solution of tin tetrachloride solution, hydrochloric acid, antimony chloride solution, and phosphoric acid to an alkali solution such as sodium hydroxide while stirring the alkali solution and coprecipitating phosphorus hydroxide, antimony hydroxide, and tin hydroxide;

(2) a method of simultaneously adding dropwise tin tetrachloride solution, antimony chloride solution, and phosphoric acid solution to an alkali solution such as sodium hydroxide while stirring the alkali solution and coprecipitating phosphorus hydroxide, antimony hydroxide, and tin hydroxide; and (3) a method of simultaneously adding dropwise alkali solution such as sodium hydroxide, tin tetrachloride solution, hydrochloric acid, antimony chloride solution, and phosphoric acid solution to water while stirring water and coprecipitating phosphorus hydroxide, antimony hydroxide, and tin hydroxide.

In either case, as the alkali, potassium hydroxide, calcium hydroxide, and ammonium hydroxide can be used. Instead of tin tetrachloride, tin dichloride and tin sulfate can also be used. Instead of hydrochloric acid, sulfuric acid and nitric acid can also be used. Instead of antimony chloride, antimony sulfate can also be used.

Coprecipitation is caused by a hydrolysis reaction. In order to promote the hydrolysis reaction, alkali solution or water may be heated. A primary particle size of coprecipitates can be controlled by the selection of the coprecipitation method, the dropwise addition rate in the method, and the like. In order to obtain an infrared ray cut-off material having a uniform particle size and composition, the coprecipitation method (3) is preferably used.

Baking conditions of hydroxides of phosphorus, antimony, and tin are not particularly limited, but it is preferable that baking be performed in the atmosphere or in an oxidizing atmosphere at 750° C. to 850° C. for 0.5 hours to 3 hours, from the viewpoints of infrared ray cutting properties and transparency to visible lights.

[Dispersion (Dispersion Liquid)]

A dispersion according to an embodiment of the present invention is obtained by dispersing the above-described infrared ray cut-off material in a solvent. Examples of the solvent include water and organic solvents such as toluene, xylene, acetone, and ethanol. The amount of the infrared ray cut-off material added is not limited, but is preferably 5 mass % to 60 mass % with respect to the total mass of the dispersion.

[Infrared Ray Cut-Off Film-Forming Composition]

An infrared ray cut-off film-forming composition according to an embodiment of the present invention is obtained by dispersing and dissolving the above-described infrared ray cut-off material and a resin in a solution. The kind of the solvent is the same as above. As the resin, any resins which are generally used for a dispersion, coating material, paste, or the like can be used as long as they are soluble in the solvent used, can disperse the infrared ray cut-off material, and can cohere the infrared ray cut-off material to form an infrared ray cut-off film after evaporating the solvent. Examples of the resin include acrylic resins, polyethylene terephthalate resins, and urethane resins. In addition, the infrared ray cut-off material may be dispersed in an acrylic coating material, a polyester coating material, a urethane coating material, or the like into which the resin solid content and the solvent are incorporated in advance. Examples of this kind of coating material include "ACRYLIC" (trade name, manufactured by Kansai Paint Co., Ltd.) and "ACRYDIC" (trade name, manufactured by DIC Corporation). Contents of the infrared ray cut-off material and the resin in the infrared ray cut-off film-forming composition are not particularly limited. However, from the viewpoints of easy coating and film formability, when a film having a thickness of 0.1 μm to 10 μm is formed, the content of the infrared ray cut-off film is preferably 5 mass % to 50 mass % with respect to the total mass of the composition; and the content of the resin is preferably 5 mass % to 40 mass % with respect to the total mass of the composition.

[Infrared Ray Cut-Off Film]

An infrared ray cut-off film according to an embodiment of the present invention is obtained by uniformly dispersing the above-described infrared ray cut-off material in a film formed of the above-described resin. The film may contain other additives. The infrared ray cut-off film may be a coating film formed on a substrate or may be an individual film not including a substrate. In addition, in either case, the infrared ray cut-off film may be formed as a laminated film of multiple layers.

When the visible light transmittance (% Tv) of the infrared ray cut-off film is set to 90%, the IR shielding ratio [(% Tv)/(% Ts)], which is the ratio of the visible light transmittance (% Tv) to the solar transmittance (% Ts), is higher than or equal to 1.30. The upper limit of the IR shielding ratio is not particularly limited. However, in the present invention, the upper limit is considered to be approximately 1.40.

A content of the infrared ray cut-off material in the infrared ray cut-off film is not particularly limited. However, when a film having a thickness of 0.1 μm to 10 μm is formed, the content of the infrared ray cut-off material is preferably 65 mass % to 80 mass % with respect to the total mass of the infrared ray cut-off film. When additives other than the resin are added, the mass of the additives is considered to be contained in the mass of the resin. When the content of the infrared ray cut-off material in the infrared ray cut-off film is less than 65 mass % or greater than 80 mass %, it is difficult to control the IR shielding ratio at a visible light transmittance (% Tv) of 90% to be higher than or equal to 1.30 and it is difficult to form a film having a uniform distribution of the infrared ray cut-off material and a uniform thickness. Therefore, there is a tendency to limit a usage method of the infrared ray cut-off film.

In addition, when a film having a thickness of 10 μm to 100 μm is formed, the content of the infrared ray cut-off material is preferably 1 mass % to 40 mass % with respect to the total mass of the composition.

Furthermore, when a film having a thickness of 0.1 mm to 1 mm is formed, the content of the infrared ray cut-off material is preferably 0.1 mass % to 5 mass % with respect to the total mass of the composition.

A specific example of a method of forming the infrared ray cut-off film according to the embodiment will be described.

A commercially available acrylic coating material (manufactured by DIC Corporation, trade name: ACRYDIC A-168) is dissolved in a mixed solvent of toluene and xylene (volume ratio=1:1); and the above-described infrared ray cut-off material is added thereto and adjusted such that the content [Mass of Infrared Cut-Off Material/(Total Mass of Infrared Cut-Off Material+Resin)] of the infrared ray cut-off material in a dried coating film is 70 mass % and such that the total solid content [(Total Mass of Infrared Ray Cut-Off Material+Resin in Acrylic Coating Material)/(Total Mass of Infrared Ray Cut-Off Material+Acrylic Coating Material+Solvent (Toluene and Xylene))] is 10 mass %. As a result, an infrared ray cut-off film-forming composition is prepared. Next, in order to change the visible light transmittance, the prepared infrared ray cut-off film-forming composition is coated onto PET films having two different thicknesses using a thickness-controllable applicator, followed by drying at 100° C. As a result, an infrared ray cut-off film having a thickness of 1 μm to 3 μm is formed.

The infrared ray cut-off film formed as above has an IR shielding ratio [(% Tv)/(% Ts)] of 1.30 or higher at a visible light transmittance (% Tv) of 90%.

As compared to an infrared ray cut-off material of the related art, a standard configuration of the IR shielding ratio according to the embodiment is approximately as follows.

(a) When a film containing tin oxide powder has transparency at a visible light transmittance (% Tv) of approximately 94%, a solar transmittance (% Ts) is also high at approximately 91%. Therefore, an IR shielding ratio is low at approximately 1.0. A transmittance at 2000 nm is approximately 45%.

(b) When a film containing ATO powder with 10 mass % of $SbO_2$ has transparency at a visible light transmittance (% Tv) of approximately 90%, a solar transmittance (% Ts) is approximately 73%. Therefore, an IR shielding ratio is approximately 1.2, which is higher than that of the film containing tin oxide powder. A transmittance at 2000 nm is approximately 11%. In addition, when a film containing ATO powder with 20 mass % of $SbO_2$ has transparency at a visible light transmittance (% Tv) of approximately 90%, a solar transmittance (% Ts) is low at approximately 67% and an IR shielding ratio is approximately 1.29.

(c) In the case of a film containing the same content of ITO powder as that of tin oxide powder of (a) or ATO powder of (b), a visible light transmittance (% Tv) is approximately 99% and the transparency is high. In addition, in this case, a solar transmittance (% Ts) is low at 67% and an IR shielding ratio is high at 1.4 or higher.

(d) In the case of the infrared ray cut-off film containing the infrared ray cut-off material according to the embodiment, by doping antimony tin oxide with phosphorus, a solar transmittance (% Ts) at a visible light transmittance (% Tv) of 90% is low at 69% or lower and an IR shielding ratio is higher than or equal to 1.30 without using expensive indium.

Use of the infrared ray cut-off film formed of the infrared ray cut-off material according to the present invention is not limited, and examples thereof include the following products.

Window glasses (windowpanes) of a building or a vehicle in which the infrared ray cut-off film is formed on a front surface and/or a back surface of a substrate which is formed of a transparent glass plate or plastic plate Curtains in which the infrared ray cut-off film is formed on a front surface and/or a back surface of a curtain main body which is formed of flexible cloth Plastic plates into which the infrared ray cut-off material is kneaded Laminated glasses in which the infrared ray cut-off material is kneaded into an intermediate film

EXAMPLES

Hereinbelow, the present invention will be described in detail using examples. However, the present invention is not limited thereto.

[Manufacture of Infrared Ray Cut-Off Material]

Infrared cut-off materials having compositions shown in Tables 1 and 2 were manufactured. 92 g of 55 mass % of aqueous tin tetrachloride solution, 14 g of 17 mass % of hydrochloric acid, a predetermined amount of 60 mass % of aqueous antimony chloride solution, and a predetermined amount of 85 mass % of aqueous phosphoric acid solution were mixed with each other. This mixed solution and 25 mass % of aqueous sodium hydroxide solution were respectively added dropwise to 1 dm$^3$ of water while stirring water and maintaining the temperature at 60° C. The pH of the solution was maintained at 5 to 6. After completion of the dropwise addition, residual salts were removed by decantation, followed by filtration. The solid content of filter residue was dried and baked at 800° C. for 2 hours in the atmosphere.

The obtained powder sample was subjected to ICP analysis to obtain parts by mass of Sb and P in terms of $SbO_2$ and $PO_{2.5}$ with respect to 100 parts by mass of the infrared ray cut-off material. The analysis results are shown in Tables 1 and 2. It was confirmed that the balance other than antimony oxide and phosphorus oxide was tin oxide (mainly, $SnO_2$).

[Preparation of Infrared Ray Cut-Off Film-Forming Composition]

The obtained powder sample was added to a solution in which a commercially available acrylic coating material (manufactured by DIC Corporation, trade name: ACRYDIC A-168) was dissolved in a mixed solvent of toluene and xylene (volume ratio=1:1). The addition amount thereof was adjusted such that the content (which is the value of [Mass of Infrared Ray Cut-Off Material/(Total Mass of Infrared Ray Cut-Off Material+Resin in Acrylic Coating Material)] during the drying of the coating film) of the infrared ray cut-off material in the coating film was 70 mass % and such that the total solid content [(Total Mass of Infrared Ray Cut-Off Material+Resin in Acrylic Coating Material)/(Mass of Infrared Ray Cut-Off Material+Acrylic Coating Material+Solvent (Toluene and Xylene))] was 10 mass %. The obtained mixture was put into a vessel into which beads had been put in advance, followed by stirring for 10 hours with a paint shaker. As a result, an infrared ray cut-off film-forming composition was prepared.

[Formation of Infrared Ray Cut-Off Film]

The prepared infrared ray cut-off film-forming composition was coated on PET films with an applicator, followed by drying at 100° C. As a result, plural infrared ray cut-off films having a thickness of 1 µm to 3 µm were formed.

[Evaluation of IR Shielding Ratio]

For each of the formed infrared ray cut-off films, a visible light transmittance (% Tv) and a solar transmittance (% Ts) were measured to obtain an IR shielding ratio using a spectrophotometer (manufactured by Hitachi Ltd., trade name: U-4000) based on a baseline of [% Tv] and [% Ts] of a uncoated PET film. The IR shielding ratio is changed depending on the visible light transmittance, and the visible light transmittance is changed depending on the thickness of the infrared ray cut-off film. However, as illustrated in FIG. 1, in a visible light transmittance range of 84% to 96%, the visible light transmittance and the IR shielding ratio have an almost linear relationship. In addition, in Examples 1 to 26 and Comparative Examples 1 to 25, the measured values of the visible light transmittance were 84% to 96%. Therefore, the IR shielding ratio at a visible transmittance of 90%, which was almost the intermediate value in the above-described range, was used for the evaluation.

In order to obtain the IR shielding ratio at a visible light transmittance of 90%, plural films having different thicknesses were formed, respective measured values were connected to obtain a straight line as illustrated in FIG. 1, and an IR shielding ratio at a point of visible light transmittance of 90% was obtained from the straight line. In Tables 1 and 2, the measurement results for parts by mass of $SbO_2$ and $PO_{2.5}$ and the IR shielding ratio at a visible light transmittance of 90% in Examples 1 to 26 and Comparative Examples 1 to 25 are shown.

In addition, in Table 3, the vertical axis represents part(s) by mass of $SbO_2$; and the horizontal axis represents part(s) by mass of $Po_{2.5}$, and the results for the IR shielding ratio at a visible light transmittance of 90% are shown. It was found that Examples 1 to 26 having an IR shielding ratio of 1.30 or higher were located inside the thick solid line of Table 3; and Comparative Examples 1 to 25 having an IR shielding ratio of lower than 1.30 were located outside the thick solid line of Table 3.

TABLE 1

|  | Part(s) by Mass of $SbO_2$ | Part(s) by Mass of $PO_{2.5}$ | IR Shielding Ratio at Visible Light Transmittance of 90% |
|---|---|---|---|
| Example 1 | 14 | 1 | 1.30 |
| Example 2 | 14 | 5 | 1.30 |
| Example 3 | 14 | 12 | 1.30 |
| Example 4 | 14 | 20 | 1.30 |
| Example 5 | 14 | 25 | 1.30 |
| Example 6 | 15 | 25 | 1.33 |
| Example 7 | 16 | 12 | 1.30 |
| Example 8 | 16 | 13 | 1.32 |
| Example 9 | 18 | 19 | 1.35 |
| Example 10 | 18 | 22 | 1.34 |
| Example 11 | 19 | 15 | 1.34 |
| Example 12 | 20 | 1 | 1.30 |
| Example 13 | 20 | 8 | 1.30 |
| Example 14 | 20 | 9 | 1.32 |
| Example 15 | 20 | 15 | 1.30 |
| Example 16 | 20 | 20 | 1.35 |
| Example 17 | 20 | 25 | 1.34 |
| Example 18 | 22 | 12 | 1.34 |
| Example 19 | 22 | 13 | 1.30 |
| Example 20 | 23 | 2 | 1.30 |
| Example 21 | 23 | 6 | 1.32 |
| Example 22 | 30 | 1 | 1.30 |
| Example 23 | 30 | 2 | 1.30 |
| Example 24 | 30 | 12 | 1.30 |

TABLE 1-continued

|  | Part(s) by Mass of $SbO_2$ | Part(s) by Mass of $PO_{2.5}$ | IR Shielding Ratio at Visible Light Transmittance of 90% |
|---|---|---|---|
| Example 25 | 30 | 20 | 1.31 |
| Example 26 | 30 | 25 | 1.31 |

TABLE 2

|  | Part(s) by Mass of $SbO_2$ | Part(s) by Mass of $PO_{2.5}$ | IR Shielding Ratio at Visible Light Transmittance of 90% |
|---|---|---|---|
| Comparative Example 1 | 12 | 0 | 1.20 |
| Comparative Example 2 | 12 | 1 | 1.23 |
| Comparative Example 3 | 12 | 25 | 1.26 |
| Comparative Example 4 | 13 | 1 | 1.29 |
| Comparative Example 5 | 13 | 5 | 1.28 |
| Comparative Example 6 | 13 | 12 | 1.29 |
| Comparative Example 7 | 13 | 20 | 1.29 |
| Comparative Example 8 | 13 | 25 | 1.28 |
| Comparative Example 9 | 14 | 0 | 1.29 |
| Comparative Example 10 | 14 | 26 | 1.29 |
| Comparative Example 11 | 18 | 0 | 1.29 |
| Comparative Example 12 | 20 | 0 | 1.29 |
| Comparative Example 13 | 22 | 0 | 1.27 |
| Comparative Example 14 | 25 | 0 | 1.29 |
| Comparative Example 15 | 30 | 0 | 1.29 |
| Comparative Example 16 | 30 | 26 | 1.29 |
| Comparative Example 17 | 31 | 1 | 1.28 |
| Comparative Example 18 | 31 | 5 | 1.29 |
| Comparative Example 19 | 31 | 6 | 1.29 |
| Comparative Example 20 | 31 | 20 | 1.28 |
| Comparative Example 21 | 32 | 25 | 1.27 |
| Comparative Example 22 | 32 | 0 | 1.27 |
| Comparative Example 23 | 32 | 1 | 1.28 |
| Comparative Example 24 | 32 | 20 | 1.25 |
| Comparative Example 25 | 32 | 25 | 1.25 |

TABLE 3

Part(s) by Mass of $PO_{2.5}$ with respect to 100 Parts by Mass of Infrared Ray Cut-Off Material

| Part(s) by Mass of $SbO_2$ with respect to 100 Parts by Mass of Infrared Ray Cut-Off Material | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 12 | 1.20 | 1.23 |  |  |  |  |  |  |  |  |  |  |  |  |
| 13 |  | 1.29 |  |  |  | 1.28 |  |  |  |  |  |  | 1.29 |  |
| 14 | 1.29 | 1.30 |  |  |  | 1.30 |  |  |  |  |  |  | 1.30 |  |
| 15 |  |  |  |  |  |  |  |  |  |  |  |  |  |  |
| 16 |  |  |  |  |  |  |  |  |  |  |  |  | 1.30 | 1.32 |
| 17 |  |  |  |  |  |  |  |  |  |  |  |  |  |  |
| 18 | 1.29 |  |  |  |  |  |  |  |  |  |  |  |  |  |
| 19 |  |  |  |  |  |  |  |  |  |  |  |  |  |  |
| 20 | 1.29 | 1.30 |  |  |  |  |  |  |  | 1.30 |  | 1.32 |  |  |
| 21 |  |  |  |  |  |  |  |  |  |  |  |  |  |  |
| 22 | 1.27 |  |  |  |  |  |  |  |  |  |  |  | 1.34 | 1.30 |
| 23 |  |  |  |  |  | 1.30 | 1.32 |  |  |  |  |  |  |  |
| 24 |  |  |  |  |  |  |  |  |  |  |  |  |  |  |
| 25 | 1.29 |  |  |  |  |  |  |  |  |  |  |  |  |  |
| 26 |  |  |  |  |  |  |  |  |  |  |  |  |  |  |
| 27 |  |  |  |  |  |  |  |  |  |  |  |  |  |  |
| 28 |  |  |  |  |  |  |  |  |  |  |  |  |  |  |
| 29 |  |  |  |  |  |  |  |  |  |  |  |  |  |  |
| 30 | 1.29 | 1.30 |  |  |  | 1.30 |  |  |  |  |  |  | 1.30 |  |
| 31 |  | 1.28 |  |  |  | 1.29 |  |  |  |  |  |  | 1.29 |  |
| 32 | 1.27 | 1.28 |  |  |  |  |  |  |  |  |  |  |  |  |

| Part(s) by Mass of $SbO_2$ with respect to 100 Parts by Mass of Infrared Ray Cut-Off Material | 14 | 15 | 16 | 17 | 18 | 19 | 20 | 21 | 22 | 23 | 24 | 25 | 26 |
|---|---|---|---|---|---|---|---|---|---|---|---|---|---|
| 12 |  |  |  |  |  |  |  |  |  |  |  | 1.26 |  |
| 13 |  |  |  |  |  |  | 1.29 |  |  |  |  | 1.28 |  |
| 14 |  |  |  |  |  |  | 1.30 |  |  |  |  | 1.30 | 1.29 |
| 15 |  |  |  |  |  |  |  |  |  |  |  | 1.33 |  |
| 16 |  |  |  |  |  |  |  |  |  |  |  |  |  |
| 17 |  |  |  |  |  |  |  |  |  |  |  |  |  |
| 18 |  |  |  |  |  | 1.35 |  |  | 1.34 |  |  |  |  |
| 19 |  | 1.34 |  |  |  |  |  |  |  |  |  |  |  |
| 20 |  | 1.30 |  |  |  |  | 1.35 |  |  |  |  | 1.34 |  |
| 21 |  |  |  |  |  |  |  |  |  |  |  |  |  |
| 22 |  |  |  |  |  |  |  |  |  |  |  |  |  |
| 23 |  |  |  |  |  |  |  |  |  |  |  |  |  |
| 24 |  |  |  |  |  |  |  |  |  |  |  |  |  |
| 25 |  |  |  |  |  |  |  |  |  |  |  |  |  |
| 26 |  |  |  |  |  |  |  |  |  |  |  |  |  |
| 27 |  |  |  |  |  |  |  |  |  |  |  |  |  |
| 28 |  |  |  |  |  |  |  |  |  |  |  |  |  |
| 29 |  |  |  |  |  |  |  |  |  |  |  |  |  |
| 30 |  |  |  |  |  |  | 1.31 |  |  |  |  | 1.31 | 1.29 |
| 31 |  |  |  |  |  |  | 1.28 |  |  |  |  | 1.27 |  |
| 32 |  |  |  |  |  |  | 1.25 |  |  |  |  | 1.25 |  |

As illustrated in Tables 1 to 3, in Examples 1 to 26 in which the content of $SbO_2$ in the infrared ray cut-off material was not less than 14 parts by mass and not more than 30 parts by mass and the content of $PO_{2.5}$ was not less than 1 part by mass and not more than 25 parts by mass, superior results in which the IR shielding ratio [(% Tv)/(% Ts)] at a visible light transmittance of 90% was stable and higher than or equal to 1.30 were obtained. In addition, the transparency of Examples 1 to 26 was superior.

On the other hand, in Comparative Examples 1 to 25 in which the values were out of the above-described ranges, the IR shielding ratio was lower than 1.30.

FIG. 1 is a graph illustrating a relationship between an IR shielding ratio and a visible light transmittance of films which are formed under the above-described conditions using an infrared ray cut-off material according to an embodiment of the present invention (Example 16), ITO powder (abbreviated as "ITO" in FIG. 1), phosphorus-free ATO powder (content of $SbO_2$: 20 mass %, abbreviated as "Phosphorus-Free ATO" in FIG. 1), and commercially available ATO powder (trade name: T-1; manufactured by Mitsubishi Electronic Chemicals Co., Ltd., abbreviated as "T-1" in FIG. 1). Regarding each powder, measured values when films having different thicknesses were formed were plotted. In the range shown in Table 1, the IR shielding ratio and the visible light transmittance have a linear relationship. In addition, it was found from FIG. 1 that the infrared ray cut-off material of Example 16 had an IR shielding ratio of 1.35 at a visible light transmittance of 90%.

INDUSTRIAL APPLICABILITY

According to the present invention, an infrared ray cut-off material, capable of forming an infrared ray cut-off film that is inexpensive and has high transparency, can be provided. Accordingly, the present invention is industrially applicable.

The invention claimed is:

1. An infrared ray cut-off material that is formed of phosphorus-doped antimony tin oxide powder,
   wherein a content of antimony in terms of $SbO_2$ is not less than 14 parts by mass and not more than 30 parts by mass with respect to 100 parts by mass of the infrared ray cut-off material,
   a content of phosphorus in terms of $PO_{2.5}$ is not less than 1 part by mass and not more than 25 parts by mass with respect to 100 parts by mass of the infrared ray cut-off material, and
   a balance other than antinomy oxide and phosphorus oxide is tin oxide.

2. The infrared ray cut-off material according to claim 1, wherein a BET diameter of the infrared ray cut-off material, calculated from a specific surface area thereof, is not less than 0.005 μm and not more than 0.03 μm.

3. A dispersion of an infrared ray cut-off material obtained by dispersing the infrared ray cut-off material according to claim 1 in a solvent.

4. An infrared ray cut-off film-forming composition obtained by dispersing the infrared ray cut-off material according to claim 1 and a resin in a solvent.

5. An infrared ray cut-off film containing the infrared ray cut-off material according to claim 1 in a film formed of a resin.

6. The infrared ray cut-off film according to claim 5, wherein when a visible light transmittance (% Tv) of the infrared ray cut-off film is set to 90%, an IR shielding ratio [(% Tv)/(% Ts)], which is the ratio of the visible light transmittance (% Tv) to a solar transmittance (% Ts), is higher than or equal to 1.30.

* * * * *